United States Patent [19]

Mount, II

[11] Patent Number: 4,649,550
[45] Date of Patent: Mar. 10, 1987

[54] TELEMETRY SCHEME WITH SLOPE MODULATED SIGNAL

[75] Inventor: Houston B. Mount, II, Tulsa, Okla.

[73] Assignee: Amoco Corporation, Chicago, Ill.

[21] Appl. No.: 452,254

[22] Filed: Dec. 22, 1982

[51] Int. Cl.[4] .............................................. H04L 27/00
[52] U.S. Cl. ......................................... 375/37; 328/35; 332/1
[58] Field of Search ................ 375/1, 35, 55; 328/36, 328/35; 307/261; 371/1, 2, 30, 37; 332/1; 333/19, 20

[56] References Cited

U.S. PATENT DOCUMENTS

| | | |
|---|---|---|
| 3,040,257 | 6/1962 | White ..................................... 328/36 |
| 3,255,363 | 6/1966 | Stella ..................................... 328/36 |
| 3,796,960 | 3/1974 | Frizzell et al. ......................... 307/261 |
| 4,027,335 | 5/1977 | Miller ..................................... 375/55 |
| 4,122,300 | 10/1978 | Busiginy et al. ....................... 375/55 |
| 4,234,897 | 11/1980 | Miller ..................................... 375/55 |
| 4,355,392 | 10/1982 | Doi et al. ................................ 371/2 |
| 4,438,519 | 3/1984 | Bose ....................................... 375/23 |
| 4,498,178 | 2/1985 | Ohhashi ................................. 371/37 |

Primary Examiner—Robert L. Griffin
Assistant Examiner—Stephen Chin

[57] ABSTRACT

A system for transmitting information contained in the form of bits. An encoded signal of two levels of magnitude is generated so that for each data word in the signal, the duration of the encoded signal at one level is equal to the duration of the encoded signal at the second level. The encoded signal is then used to generate a slope signal. It is this slope signal which is transmitted.

10 Claims, 10 Drawing Figures

TRANSMIT SUBROUTINE PROGRAM

MAIN RECEIVE PROGRAM

TELEMETRY SCHEME WITH SLOPE MODULATED SIGNAL

BACKGROUND OF THE INVENTION

This invention concerns a method of transmitting information contained in bits. It particularly pertains to the transmission of information between an instrument lowered in a borehole drilled in the earth and the surface. It is especially adapted to wireline well logging which is accomplished by suspending specialized devices in a well on a long cable and measuring various properties within the well in which it is drilled and transmitting the information to the surface over the wireline.

As it is well known, wells are drilled deep into the earth in the search for the production of oil and gas. It is important to perform many different operations downhole with specialized devices lowered on a wireline. It is also important to be able to control the specialized device from the surface and also of even greater importance is to transmit information detected by the device to the surface. A typical cable used for well logging is seven No. 20 gauge insulated conductors, spiral wrapped in two layers of steel wire, and may be as long as 30,000 ft. In the existing system, more than a microfarad of capacity may exist between any two conductors or between any single conductor and the steel sheath surrounding the conductors.

If more than two or three measurements or control functions or channels are to be carried out through the seven existing conductors in the example given, some method of timesharing must be used. One common method of doing so is to digitize the signals and transmit the information one binary digit or bit at a time, one channel after another. Any number of channels can be transmitted along a signal pair of wires in this fashion limited by the frequency bandwidth of the cable and the maximum amount of time that the user considers acceptable to cycle through all channels. Special transmission of binary digital data can ordinarily be accomplished by representing a binary one as one selected DC voltage signal, for example five volts and a binary zero as another DC voltage, for example, zero voltage. Digital data transmission in this manner might be observed on an oscilloscope. Due to the length and capacity of a logging cable, however, transmission of DC voltages in this fashion is somewhat impractical. The bits of information become distorted as data rates increase until the signal cannot be decoded. This is primarily a result of the limited current capacity of the transmitter not being able to drive the wireline to the appropriate voltage quickly enough and the limited bandwidth of the cable. A common method to avoid this problem is by the use of frequency modulation. The ones and zeros of the binary data are coded as bursts of two distinct frequencies. For example, the ones might be coded for 300 Hz and the zeros for 600 Hz. These signals can be detected and separated at the receiver throughout a wide range of amplitude, and the data can then be reconstructed.

SUMMARY OF THE INVENTION

This invention concerns a method of transmitting information contained in serial form in bits. In a preferred form, I obtain an encoded signal by generating a set of two segments for each such bit. In each said set one segment is of a voltage level different from the other. A slope modulated signal is then generated from the encoded signal and is transmitted as a slope modulated signal. An example of a slope modulated signal is one with a rising slope during one voltage level of the encoded signal and a falling slope during the other voltage level of such encoded signal. Means are provided at the receiving end of the signal transmission system to convert the transmitted signal into the original signal or what other form may be desired.

It is thus an object of this invention to describe a new and more efficient manner of transmitting large amounts of data over wirelines.

DETAILED DESCRIPTION OF THE PREFERRED EMBODIMENT

Figure 1:
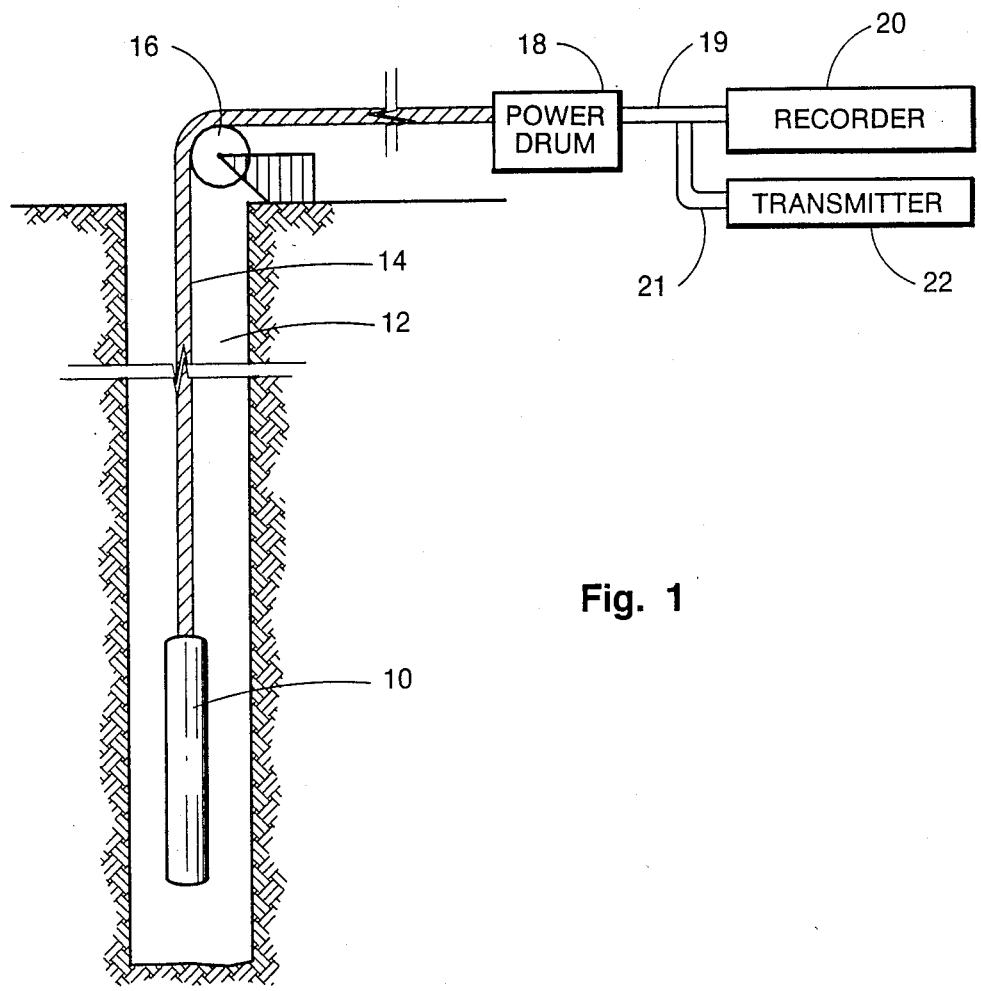
FIG. 1 illustrates a wireline tool suspended in a wellbore.

Attention is first directed to FIG. 1 which illustrates a specialized device 10 such as a logging tool or sidewall core cutter in a wellbore 12 suspended by line 14 over a counter pulley 16 at the surface. Cable 14 extends through a power drum 18 to a surface recorder 20. It is in this setting that I anticipate the largest use of my invention. The wellbore 12 may have a depth of anywhere from a few hundred feet deep to 15 to 20 thousand feet or more. The counter wheel 16 is typically used to determine the amount of cable 14 which is lowered into the wellbore so that the position of tool 10 can always be accurately determined. Drum 18 is a typical drum which is commercially used by many well service companies and provides the power to tool 10 and also provides means for raising and lowering cable 14. The cable 14 is connected through cable 19 to recorder 20 which records the signals from tool 10. If desired, a transmitter 22 can be connected through cable 21 to cable 14 and signals can be transmitted down the cable to tool 10. It is this setting of FIG. 1 in which I anticipate the largest use of my invention will be made.

Figure 2:
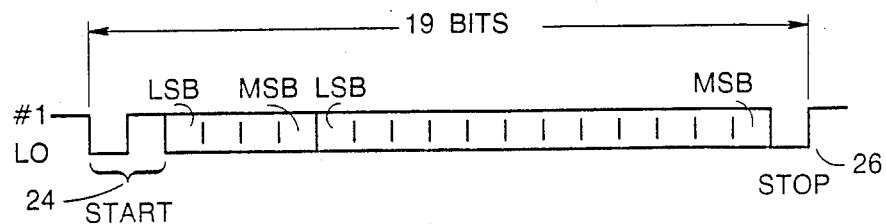
FIG. 2 is a typical format of a serial data word.

A typical cable used for well logging is seven No. 20 gauge insulated conductors, spiral wrapped in two layers of steel wire, and may be as long as 30,000 ft. More than a microfarad of capacity may exist between any two conductors or between any single conductor and the steel sheath surrounding the seven conductors. If more than two or three measurements or control functions or channels are to be carried out through the existing conductors, some method of timesharing must be used. One common method of doing so is to digitize the signals and transmit the information one binary bit or digit at a time, one channel after another. Any number of channels can be transmitted along a single pair of wires in this fashion, but it is limited by the frequency bandwidth of the cable and the maximum amount of time that the user considers acceptable to cycle through all channels. A typical format of a serial data word is shown in FIG. 2. Shown there is a word indicated to have a total of 45 bits. It has a start section at 24 and a stop section at 26. The start section 24 has two bits, one of a zero voltage or representing zero, and the other level representing a one which may be one or five voltage or whatever might be desired.

After the two start bits, there are 4 bits which are used here to identify the number of the data channel which is being transmitted in this serial data word. Here the first bit (that nearest to the start bits) is used to represent the least significant ("ones place") bit (LSB) of the binary channel number. The fourth bit to the right of the start bits represents the most significant bit (MSB) ("8's place") of the channel number.

The twelve bits following the channel number are the data bits associated with the channel number. They are arranged here also least significant digit on the left (i.e., first in time) in ascending order to the most significant bit on the right.

Figure 3:
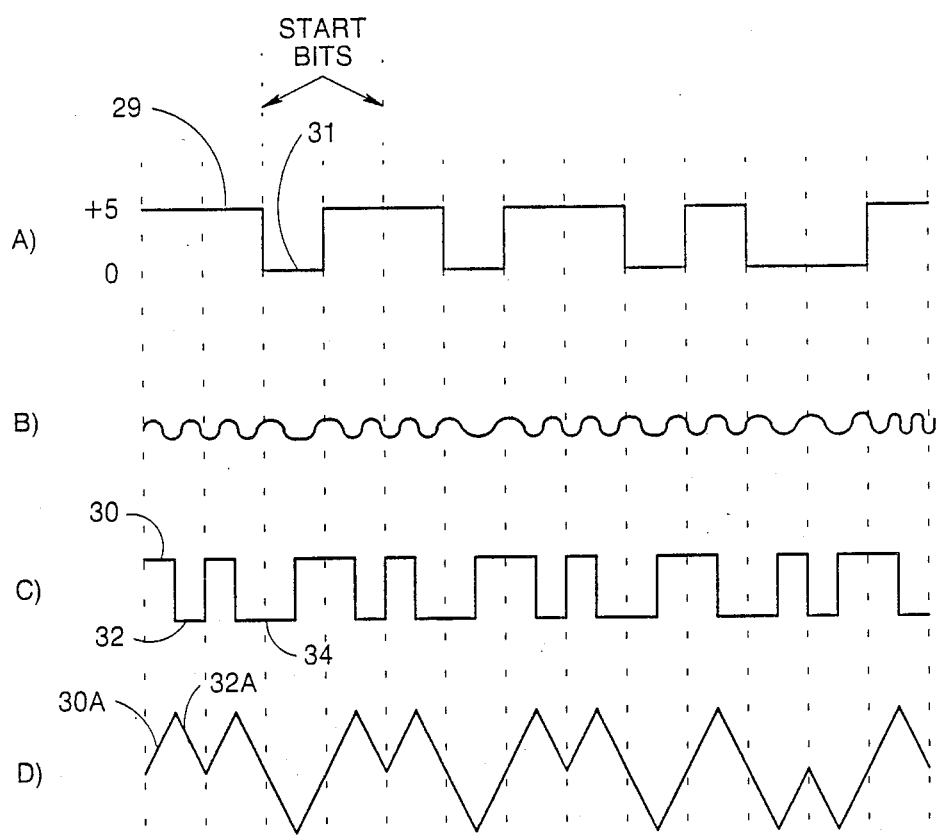
FIG. 3 shows Signal A which is a square wave signal; Signal B which is Signal A in frequency modulated form; Signal C which is Signal A encoded to be slope modulated; and Signal D, which is a slope modulated signal.

Signal A of FIG. 3 shows a square wave signal having a zero value and a plus five voltage for a one value. The value of these voltages can be any convenient value so long as they are adequately separated. Signal A represents a signal containing the information which you desire to transmit. However, transmission of DC voltages in this fashion is somewhat impractical. The bits of information become distorted as data rates increase until the signal cannot be decoded. This is primarily a result of the limited current capacity of the transmitter not being able to drive the wireline to the appropriate voltage level quickly enough and of the cable bandwidth. A common method used to avoid this problem is "frequency modulation". The ones and zeros of the binary data are coded as two distinct frequencies. For example, the ones would have 300 Hz and the zeros have 600 Hz. This is indicated in FIG. 3, Signal B, in which the logical one is represented by a higher frequency than is the logical zero of Signal A. The method which I propose in this invention involves the use of slope modulation. In the slope modulation method, a binary one is represented by a rising voltage or a positive slope and the binary zero as a falling voltage or a negative slope. The absolute voltage of the telemetry signal is not important, only whether it is rising or falling. Signal C of FIG. 3 shows a serial binary string derived from digital data shown in Signal A. In this case, Signal C is a balanced encoded telemetry signal and can be obtained by Manchester type encoding. As can be seen, each bit of Signal A is divided into a logical one and a logical zero bit. Each segment of each bit representation of Curve C is of a different voltage level. Segment 30 is positive because bit 29 which it represents is positive. Then, segment 32 is the opposite polarity or lower voltage from that of segment 30. On the other hand, segment 34 is the lower voltage because the bit 31 which it corresponds to is the lower voltage. The second segment 36 representing bit 31 is of the higher voltage. Thus, we obtain an encoded balanced telemetry Signal C from the normal digital data of Signal A of FIG. 3.

Attention is next directed to Signal D of FIG. 3. In this case, I have converted the Signal C to a slope modulated signal; a positive value 30 as a positive slope 30A and the lower value 32 as the negative slope 32A. In other words, high levels have been converted to positive slopes and low levels to negative slopes. Note that either a positive or negative slope can exist at any absolute voltage. It is important to note that the maximum voltage and the minimum voltage obtained in Curve D is always within a controlled limit. Thus, the raw data of Signal A in FIG. 3 has been encoded in a manner such that the average time that the slope modulated signal is rising equals the average time that it is falling. What is done is representing each binary bit of data of Signal A as two sequential bits at opposite states. This prevents the signal from reaching voltage limits imposed by the transmitter. It is normal that a transmitting device has some finite limit on its voltage range, perhaps plus or minus 15 volts.

Advantages of the slope modulation method described herein as compared to the frequency modulated method of Signal B are simplicity and speed. Hardware implementation of transmitters and receivers is simpler than for frequency modulation and a large range of transmission rates can be used with no change in hardware. This has very simple adaptation to various transmission line characteristics. Similar adaptation with frequency modulating equipment generally requires changes in modulation frequency and associated hardware in order to maintain optimum data rates. Regarding speed, the maximum data rate using slope modulation is at least several times that possible with frequency modulation for a given transmission bandwidth. This is due to the fact that at least several cycles at a given frequency are required in a frequency modulated system in order to reliably recognize the data bit as a one or a zero. On the other hand, using the method described herein, only one cycle is required in slope modulation to recognize a bit.

Figure 10:
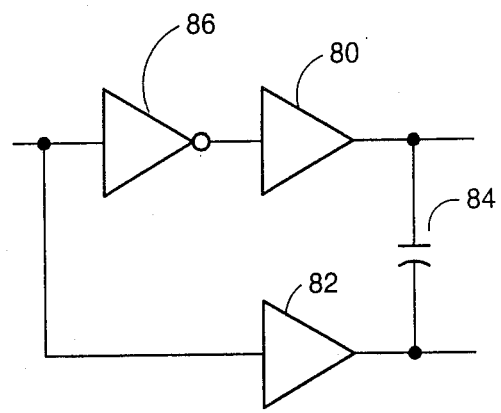
FIG. 10 illustrates a circuit for controlling the slope of the slope signal.
Figure 4:
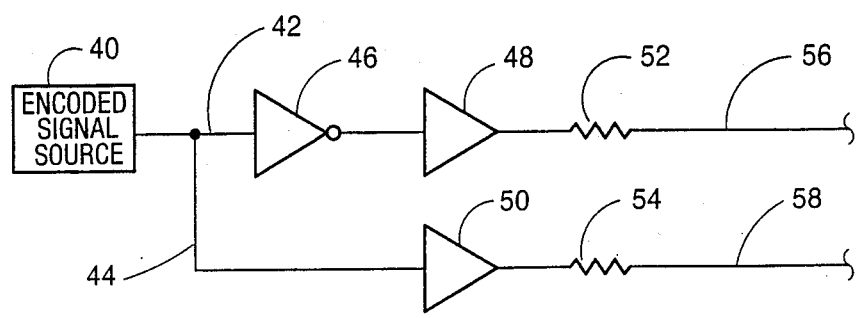
FIG. 4 is a functional diagram of the transmitter portion of the system.

Attention is next directed to FIG. 4 which is a functional outline or diagram of the transmitter portion of my system which would be use, for example, with special device 10 of FIG. 1 to obtain the slope Curve D of FIG. 3. Block 40 represents the encoded telemetry system from which Signal C of FIG. 3 is fed to the transmission portion. This transmission portion includes a line 44 connected to a line driver 50. The line driver accomplishes DC level shifting and current amplification resulting in a signal that is capable of driving the high capacity well logging cable. The output of line driver 50 is connected through a resistor 54 to one conductor 58 of the cable 14 of FIG. 1. The output of line driver 50 is fed through resistor 54 which is identical to resistor 52. The output of resistor 54 is connected to conductor 28 of cable 14 of FIG. 2. The resistors 52 and 54 are selected to limit the maximum current drawn from the line drivers 50 and 48 and also to control the rise and fall time of the resulting slope modulated signal. In this arrangement the slope will not be a straight line but actually logarithmic due to the RC circuits formed by the cable capacity and resistors 52 and 54. If the line drivers are current limited devices, resistors 52 and 54 can be deleted and a straight line slope can be generated instead of the logarithmic function. The slope can then be controlled by adding capacity to the output of the line driver as shown in FIG. 10 which shows parallel line drivers 80 and 82 started by capacitor 84. Line driver 80 is provided with an inverter 86. Item 46 is a computer logic inverter and may be a part of a Texas Instruments circuit designated SN 7404. Items 48 and 50 are each sections of an IEEE designated RS-232 line driver device, which may be a National Semiconductor DS 1488. Items 52 and 54 are common ¼ or ½ watt resistors.

In the device of FIG. 4, encoded telemetry Signal C from system 40 is fed through a branch line 42 and inverter 46 to line driver device 52. An inverted signal is generated by inverter 46 and drives the other wire 56 of the signal. This part of the circuit functions identically to the line driver resistor circuit 50 and resistor 54 previously described, except the encoded telemetry signal from block 40 is first inverted by logic inverter 46 before being slope modulated by the line driver 48 and resistor 22. This additional driver circuit doubles the differential signal voltage received at the other end of the wireline. Inverter 46, line driver 48, and resistor 52 can be eliminated in the wireline 56 connected directly to the telemetry transmitting power supply common if the additional voltage swing is not needed.

Figure 5:
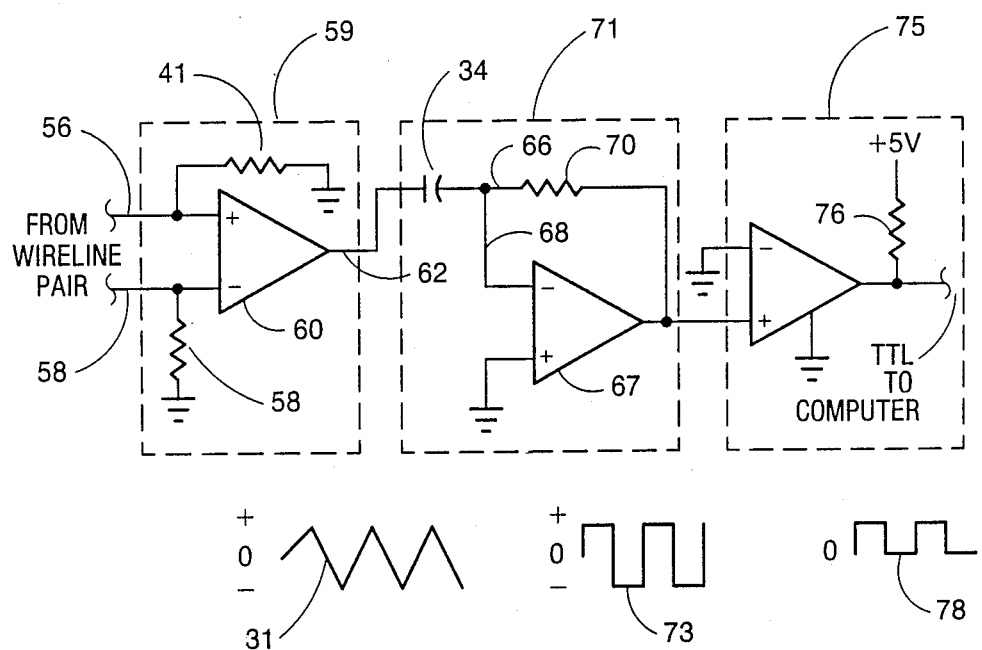
FIG. 5 is a block diagram of the surface analog processing hardware.

FIG. 5 is a functional diagram of the receiver portion of the system and is located at the surface. It includes an instrument amplifier 59, a differentiator 71 and zero crossing detector 73. Instrument amplifier 59 is connected to line 56 and 58 and converts the differential signal from the wireline pair to a single ended signal indicated by Signal 31, i.e. a signal which is ground referenced. The amplifier 60 includes resistors 39 and 41 which serve to terminate the line and provide bias current for the amplifier 60. The resulting single ended signal, indicated by Signal 31, can be observed at the output of the amplifier 59. This signal is then further processed through a differentiator stage 71 indicated by dotted line which converts the rising slopes into negative voltages and falling slopes into positive voltages as indicated at signal 73. Differentiator circuit includes a capacitor 64 which has an output divided into lines 66 and 68. Line 66 goes to resistor 70 and line 68 goes to operational amplifier 67. Thus, the differentiator stage 45 comprises an operational amplifier 67, a resistor 70 and a capacitor 64. The resistor/capacitor combination is selected to optimize the differentiation function for a given signal frequency. The output from this stage is indicated by signal 73. The output signal 73 is then processed by zero crossing detector indicated by block 75. Zero crossing detectors are well known and may comprise a voltage comparator 74 and may include a resistor 76. The output from zero crossing detector 72 is indicated by signal 78. It is thus seen that the zero crossing detector 72 serves to improve the shape of the signal pulse 73 and to shift the voltage levels to those appropriate for logic electronics and indicated at signal 78.

The encoded signal which has been reconstructed by the receiver as illustrated in FIG. 5 can be decoded by various hardware logic or programmable logic. Commercial devices are available for encoding and decoding binary digital data in Manchester code, if the flexibility of a programmable system is not required. A Harris HD-6402 universal asynchronous receiver/transmitter with a Harris HD-6408 asynchronous serial Manchester adapted can be used at each end of the system for data work linked up to 8 bits. These receiver/transmitters and adapter are commercially available from Harris Corporation. More complex data formats can best be accommodated by using the programmable computer hardware. In this regard attention is next directed to FIGS. 6, 7, 8 and 9.

Figure 6:
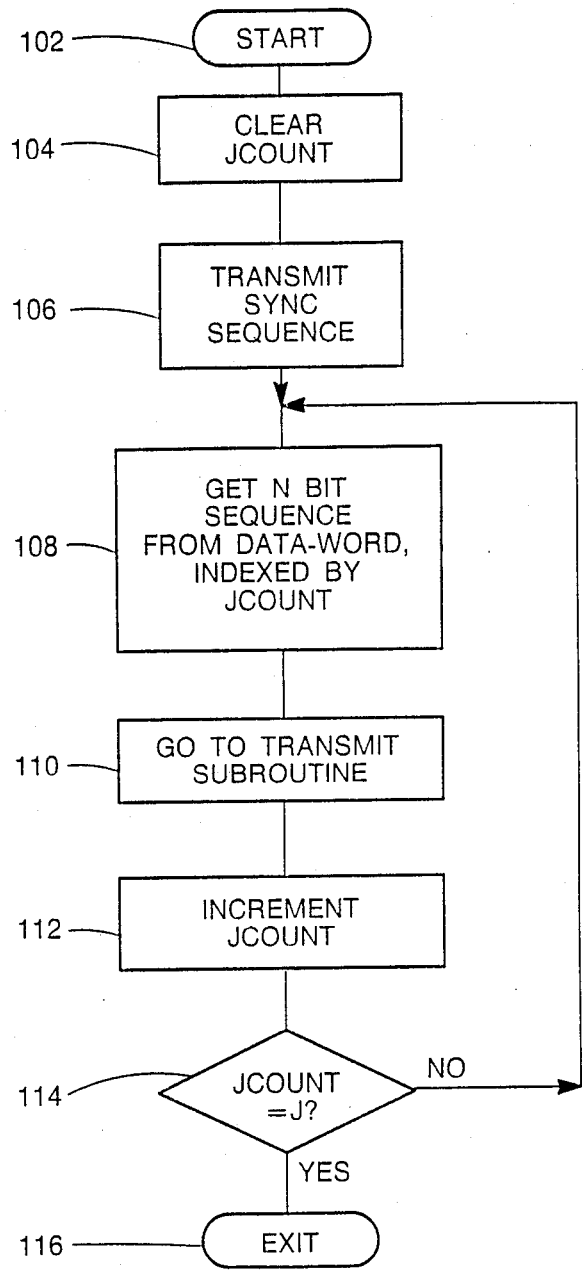
FIGS. 6, 7, 8, and 9 depict a flow diagram for software for use in developing the slope signal of this invention.

Attention is first directed to Block 102 of FIG. 6 which represents the starting position of the flow charts of FIGS. 6 to 9. The main transmit program, indicated by blocks 104, 106, 108, 110, 112 and 114, is entered from some other operating system program. The operating system program is simply any system which will pass the data which is to be transmitted to the surface. It will preferably be passed through some specific locations in memory. Time allotted to transmit each bit is fixed at a value selected to meet data transmission rate requirements without exceeding the bandwidth of the transmission line. The data to be transmitted is in the form of a dataword J times N bits in length. An example would be a dataword 20 bits long to be broken into five segments, each four bits in length. In this example, J would equal five and N would equal four.

Information to be transmitted is fed to Block 104 which is a memory location called JCOUNT which is initialized to zero so that it may be used as a counter to index which segment of N bits is to be transmitted.

A synchronization sequence, indicated by Block 106, is transmitted at the beginning of each dataword. This sequence is chosen to be identifiable from any possible sequence of data which might be transmitted and is used by the data receiving system to recognize the start of a dataword and to lock into the timing of the sequence.

In Block 108 one of the N bit sequences of data is selected according to the index counter JCOUNT. In Block 110 the selected N bit sequence is passed to the transmit subroutine for transmission and the transmit subroutine program is executed. Control is returned to Block 112 in the main transmit program and JCOUNT is incremented to point to the next N bit sequence to be transmitted. Block 114 is a decision block and determines if all J segments of the dataword have been transmitted. If so, control is returned to the operating system; if not, the program loops back to Block 108 to transmit the next segment. Block 116 is labeled the "Exit" and is used to tie the components of the flow chart of FIG. 6 to operating system program shown in FIG. 7.

Figure 7:
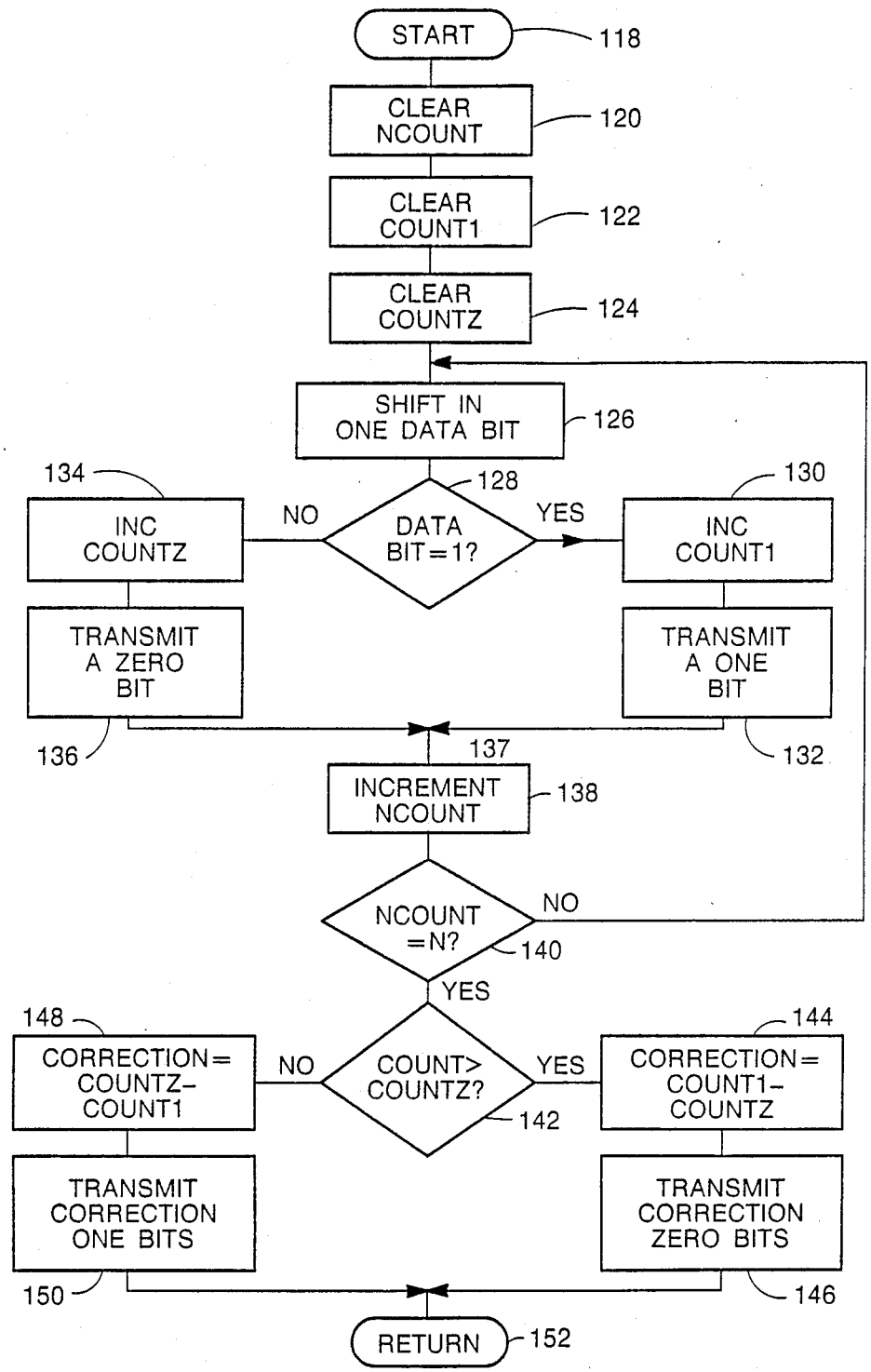
Figure 8:
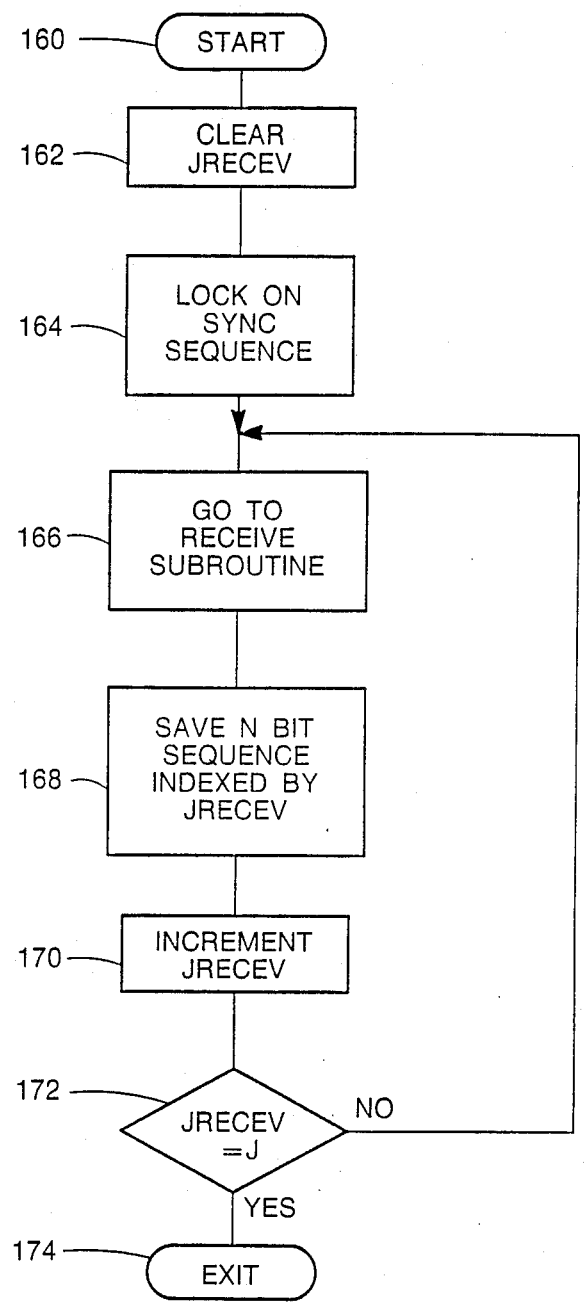

Attention is next directed to FIG. 7. Block 118 is labeled "START" where one N bit data sequence is passed to the transmit subroutine as control is transferred from the main transmit program of FIG. 6.

In Block 120 a memory location called NCOUNT is preset to zero to be used to index which bit of the N bit data segment is to be transmitted. In Block 122 a location called COUNT1 is used to count the number of binary "ones" contained in the N bit segment. In Block 124 COUNTZ is used to count "zeroes" in the N bit segment. In Block 126 one bit of the N bit segment is selected according to the bit index counter, NCOUNT.

Block 128 is a decision block to determine whether that bit is a "zero" or a "one". Control goes to Block 130 if the data bit is a one, or to Block 134 if it is a zero.

Block 130 labeled COUNT1 is incremented if the data bit was found to be a "one". The telemetry output line is commanded to transmit a "mark" or a one for one bit time period by Block 132.

In Block 134, COUNTZ is incremented if the data bit was found to be zero.

In Block 136 the telemetry output line is commanded to transmit a "space" or a zero for a single bit time period.

NCOUNT is incremented in Block 138 whether the data bit is a one or a zero.

In decision Block 140 NCOUNT is checked to determine if the entire N bit sequence has been transmitted. If not completely transmitted, the program loops to Block 126 to transmit the next bit.

After all N bits are transmitted, Block 142 determines the required type of correction bits required. If the number of binary ones transmitted was greater than the number of zeroes, control passes to Block 144; otherwise to Block 148.

Block 144 determines the number of correction spaces" to be transmitted.

In Block 146 the appropriate number of "space" bit time periods is commanded at the telemetry output line.

In Block 148 the number of correction "marks" to be transmitted is determined. The appropriate number of "mark" bit time periods is commanded by Block 150.

Block 152 is used to return control to the main transmit program.

The receive main program will, when executed, synchronize on a transmitted sequence of data and decode the J times N bits of the dataword. The dataword and program control will then be passed back to the operating system program until more data is expected. The main receive program starts at FIG. 8, Block 160. In Block 162 a memory location called JRECEV is initialized to be used as a counter to index which segment of N bits of data is being received. Block 164 identifies the selected synchronization sequence and locks the receive program to the timing of the rest of the dataword. The receive main program transfers control to the receive subroutine for reception of an N bit sequence of data in Block 166.

When control is passed back to the receive main program along with the last N bit data sequence, that sequence is stored according to the index counter, JRECEV, Block 168. JRECEV, Block 170, is incremented to index the next sequence of N bits. Decision Block 172 determines if all J segments of data have been received. If not, the program loops back to Block 166 for the next segment. Control is passed to this Block 174 when all J segments of data have been received and the entire dataword has been reconstructed. Control is then passed back to the operating system program which will make use of the data.

Figure 9:
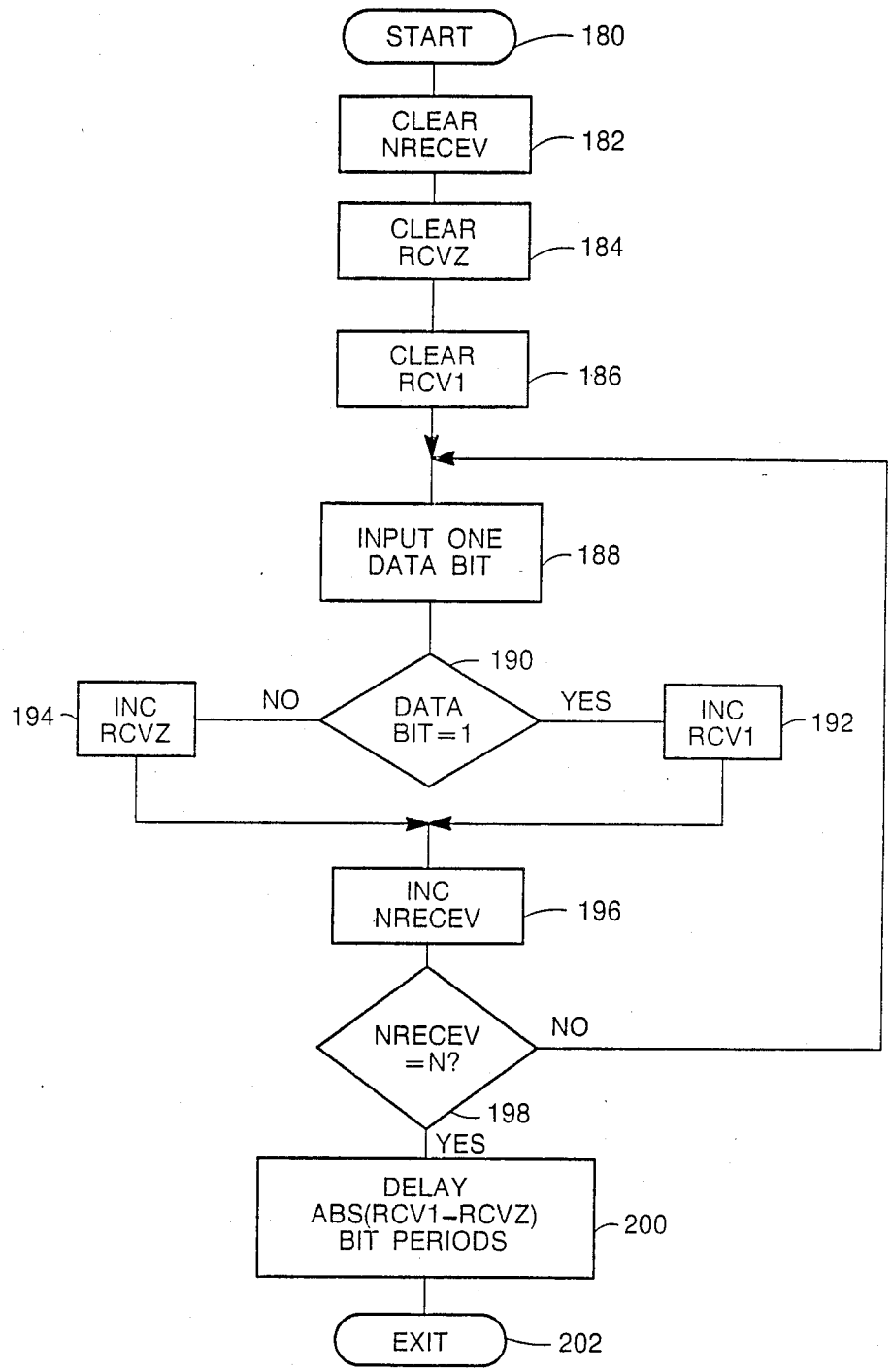

FIG. 9 shows the telemetry Receiver Subroutine Program which can reconstruct the original transmit signal.

The receive subroutine program is entered from the receive main program at start Block 180 and is already in synchronism with the dataword so that the next N bit sequence is just starting. A memory location Block 182 called NRECEV is preset to zero to be used as a counter to index which of the N bits of the data segment is being received. A memory location, Block 84, called RCVZ is preset to zero to be used to count the number of binary "zeroes" received in the N bit data segment. Another location, Block 186, called RCV1 is also preset to zero to count the number of binary "ones" received in the data segment. In Block 188 one data bit is input based on the fixed time allowed for transmission of a single bit. The bit is also saved in a location indexed by counter NRECEV indicated at Block 196 for reconstruction of the whole N bit data segment.

Decision Block 190 determines if the data bit received was a binary "one" or a "zero". If it was a "one", control goes to Block 192; otherwise to Block 194.

RCV1 counter 192 is incremented if the received data bit was a binary "one". RCV2 counter 194 is incremented if data was a "zero". NRECEV index counter 196 incremented. NRECEV 198 is checked to see if all N bits have yet been received. If not, the program loops to Block 188 to input the next bit.

In Block 200 the difference between the number of "one" and "zero" bits received is calculated and a delay of that number of bit time periods is generated in order to maintain synchronization with the next N bit data segment. The reconstructed signal exits through Block 202 and control is returned to the receive main program.

While the above description has been made in detail, various modifications can be made thereto without departing from the spirit or scope of the invention.

What is claimed is:

1. A method of transmitting information contained in bits between a borehole instrument and the surface over a high capacitance transmission cable which comprises the steps of:
   (a) generating a set of two segments for each said bit wherein one segment is of a magnitude different from that of the other to obtain an encoded signal;
   (b) generating a slope modulated voltage signal in a high capacitance transmission cable with a constant current signal produced from said encoded signal of step (a) wherein said slope modulated voltage signal is within the working bandwidth of the high capacitance transmission cable and the high capacitance transmission cable is driven from one voltage to another at the maximum attainable rate for the constant current signal; and
   (c) transmitting said slope modulated voltage signal along said transmission cable.

2. A method of transmitting information contained in bits between a borehole instrument and the surface over a high capacitance transmission cable which comprises the steps of:
   (a) generating data words of n bits;
   (b) adding m correction bits as necessary to obtain modified data words in which each data word has a number of bits at one magnitude generally equal to the number of bits at a second magnitude;
   (c) generating a slope modulated voltage signal in a high capacitance transmission cable with a constant current signal produced from said modified data words wherein said slope modulated voltage signal is within the working bandwidth of the high capacitance transmission cable and the high capacitance transmission cable is driven from one voltage to another at the maximum attainable rate for the constant current signal; and
   (d) transmitting said slope modulated voltage signal along said transmission cable.

3. A method as defined in claim 1 further comprising receiving and processing the transmitted slope modulated voltage signal.

4. A method as defined in claim 3 in which the receiving and processing step includes digitizing the slope modulated voltage signal.

5. A method as defined in claim 3 in which the receiving and processing step includes converting the received slope modulated voltage signal to the same form as the data word of step (a) of claim 1.

6. A method as defined in claim 2 in which in step (b) each data word has number of bits at one magnitude exactly equal to the number of bits at the second magnitude.

7. A system of transmitting information contained in bits between a borehole instrument and the surface over a high capacitance transmission cable which comprises:
   (a) first means for generating an encoded signal having a set of two segments for each said bit, one segment in each said set having a different magnitude from the other;

(b) second means connected to the output of said generating means for generating a slope modulated voltage signal in a high capacitance transmission cable with a constant current signal produced from said encoded signal which is within the working bandwidth of the transmission cable and which results in the high capacitance transmission cable being driven from one voltage to another at the maximum attainable rate for the constant current signal; and (c) means connected to said second means for transmitting said slope modulated voltage signal along said transmission cable.

8. An apparatus for transmitting information contained in bits between a borehole instrument and the surface over a high capacitance transmission cable which comprises:

(a) first generating means to generate data words of n bits;

(b) adding means to add m correction bits to obtain modified data words in which each data word has a number of bits at one magnitude essentially equal to the number of bits at a second magnitude;

(c) slope generating means to generate a slope modulated voltage signal in a high capacitance transmission cable which is within the working bandwidth of the transmission cable with a constant current signal produced from the modified data words of said adding means and where the high capacitance transmission cable is driven from one voltage to another at the maximum attainable rate for the constant current signal; and (d) transmitting means for transmitting said slope modulated voltage signal from said second generating means along said transmission cable.

9. An apparatus as defined in claim 8 in which said slope generating means includes a line driver and a resistor in series.

10. An apparatus as defined in claim 8 including an instrument amplifier connected to the transmitting means, a differentiator circuit connected to the output of said instrument amplifier to obtain a square wave output signal and a zero crossing detector connected to the output square wave signal of said instrument amplifier.

* * * * *